United States Patent Office 3,153,027
Patented Oct. 13, 1964

3,153,027
PROCESS FOR REMOVING IMPURITIES FROM RECYCLE SOLVENT FOR OLEFIN POLYMERIZATION
Hugh J. Hagemeyer, Jr., and Marvin B. Edwards, Longview, Tex., assignors to Eastman Kodak Company, Rochester, N.Y., a corporation of New Jersey
No Drawing. Filed Jan. 21, 1960, Ser. No. 3,724
7 Claims. (Cl. 260—94.9)

This invention relates to an improved process for the polymerization of α-olefinic hydrocarbons to solid polymer. In a specific aspect, this invention relates to an improved process for the purification of solvent that is employed in the catalytic polymerization of ethylene to solid crystalline polymer. In a more specific aspect, this invention relates to a two-step procedure for the purification of hydrocarbon solvent that is recycled to a catalytic polymerization process for the preparation of polyethylene.

It is well known in the art that α-olefinic hydrocarbons, such as ethylene and propylene, can be polymerized to form solid polymers. The reaction is usually conducted in the presence of a catalyst and a number of well-known catalysts have been employed in such a polymerization reaction. For example, it is known that oxygen and peroxy type catalysts are effective for producing polyethylene having certain specific properties. It is also known that ionic catalysts can be used in low pressure procedures for the polymerization of ethylene to solid, high-density polymers. Among the catalysts that have been used in these procedures are organo-aluminum compounds, such as triethyl aluminum, ethyl aluminum dichloride, ethyl aluminum sesquichloride and the like in admixture with transition metal compounds, such as titanium tetrachloride and titanium trichloride. Metal oxide catalysts have also been used for the low pressure polymerization of ethylene. For example, molybdenum oxide and chromium oxide have been used alone or in admixture with other metal oxides, and in some instances on support materials, such as alumina, silica and the like, for such polymerization reactions.

Frequently, the catalytic polymerization of ethylene, propylene and other α-olefinic hydrocarbons is carried out in the presence of an inert liquid organic solvent for the process. It is recognized that the use of such inert solvents is advantageous in these polymerization reactions since the reactions are quite exothermic and solvents offer an efficient expedient for ready temperature control. It has also been recognized that the solvents employed in the process must be substantially free of poisons, such as water, carbon dioxide and the like, and in order to free the solvent of such poisons the solvent has been treated by various means, such as distillation, reaction with acidic compounds, and the like.

In commercial operation, it is usually desirable to carry out the olefinic hydrocarbon polymerization reaction in a process wherein the solvent is separated from the high molecular weight polymer, and the recovered solvent is then recycled to the polymerization reactor for further preparation of polymer. Solvent that is recycled in this manner has been found to accumulate substantial quantities of impurities that are formed during the polymerization reaction. These impurities usually lead to a substantial decrease in the rate of polymerization, and in some instances, uneconomically large quantities of catalyst are required in order to maintain an efficient rate of polymerization. The presence of the impurities also tends to cause discoloration of the polymer and to lead to an undesirably high ash content of the polymer.

The impurities that are introduced to the solvent during the polymerization reaction appear to be quite different from the impurities that have in the past been removed from the fresh solvent feed for the process. Such procedures as distillation and reaction with acidic reactants which are effective for removing contaminants from the fresh solvent feed for the process are substantially ineffective for purifying recycle solvent for the polymerization reaction.

It is an object of this invention to provide a novel process for the polymerization of α-olefinic hydrocarbons wherein the polymerization reaction is carried out in an inert liquid solvent medium. It is another object of this invention to provide a novel process for the removal of impurities from hydrocarbon solvents for use in the polymerization of α-olefinic hydrocarbons. It is a further object of this invention to provide a novel process for the polymerization of ethylene to solid polymer wherein a novel procedure is employed for the purification of solvent for the reaction, and as a consequence, the rate of polymerization is maintained at a relatively high level, and the color and ash content of the polymer is maintained at a minimum. Further and additional objects of this invention will be apparent from the detailed disclosure.

In accordance with our invention, it has been found that impurities can be removed from the fresh solvent feed and from recycle solvent for an α-olefinic hydrocarbon polymerization process by a procedure that involves refluxing and distilling the solvent containing the impurities with a basic compound selected from the group consisting of the hydroxides and lower alkoxides of alkali metals and passing resulting distillate through a bed of silica gel particles. Each step of our purification process is essential although the impure solvent can have impurities removed by employing either step of our process alone. Thus, either step of our process could be employed to effect a substantial reduction in the amount of impurities contained in our recycle solvent. However, we have found that by employing the specific combination of steps in our purification system we are able to obtain a greater removal of impurities from our recycle solvent than one would expect to obtain from the results observed by using the individual purification steps of our process alone. This fact is demonstrated by the data in our examples and particularly the data in Example 1.

Our recycle solvent purification process can be used in processes that lead to the production of ethylene homopolymers, propylene homopolymers and ethylene-propylene copolymers of widely varying molecular weights and physical properties. Thus, the process in which our invention is employed can be used to form relatively low molecular weight grease-like homopolymers of ethylene. The invention can also be employed in a process for preparing wax-like and rubber-like polymers of ethylene as well as in the preparation of tough, solid, high molecular weight ethylene polymers. Our invention can also be employed in procedures for the preparation of a wide variety of propylene polymers and ethylene-propylene copolymers. Other polymerizable olefins that can be employed in our process include the α-olefinic hydrocarbons containing up to ten carbon atoms, such as 1-butene, 1-hexene, 1-octene, and 1-decene. These olefinic hydrocarbons can be polymerized either alone or in copolymerization reactions with other polymerizable hydrocarbons.

In practicing our invention, any of the catalysts that are known to polymerize olefinic hydrocarbons, such as ethylene and propylene, to high molecular weight polymers can be used. Our invention can be employed in processes for the high pressure and low pressure polymerization of ethylene, propylene and other olefinic hydrocarbons. The polymerization reaction must be carried out in a solvent medium, and by practicing our invention an efficient manner is provided for removing from the solvent medium impurities present in the fresh solvent feed and impurities that are produced during the polymerization reaction.

We prefer to employ in the polymerization reaction of our process a metal oxide catalyst which contains an oxide of a metal from Group VIA of the Periodic Table. Examples of the metal oxides that can be employed are chromium oxide, molybdenum oxide, tungsten oxide and uranium oxide. These metal oxides can be employed in the unsupported form as polymerization catalysts, but it is usually desirable to disperse the metal oxide catalysts on a suitable support, such as alumina, silica and the like. It is also desirable to activate these metal oxide catalysts with an alkali metal, such as sodium, potassium and lithium. The preferred catalyst for use in our polymerization reaction usually contains a weight ratio of metal oxide to support within the range of 1:20 to 1:1, and as a result of our invention it is possible to employ alkali metal activator in an amount not substantially greater than the amount that can be adsorbed onto the metal oxide catalyst. Usually, the amount of alkali metal activator that is used is within the range of 5 to 25% by weight of catalyst. The use of greater amounts of alkali metal is unnecessary, and in some instances can lead to highly undesirable results in the polymerization reaction and in the properties of the polymer that is produced.

The details of our invention will be discussed using a molybdenum oxide catalyst dispersed on alumina and activated with sodium metal. However, it will be understood that in our polymerization process any of the other known olefinic hydrocarbon polymerization catalysts can be employed.

The polymerization reaction is usually carried out at a temperature within the range of 75° C. to 325° C. and preferably within the range of 130° C. to 260° C. The polymerization pressure can vary from atmospheric pressure up to 15,000 p.s.i.g. and higher. The reaction conditions for our polymerization reaction can be varied rather widely, and the specific conditions that are employed in the polymerization reaction are dependent to a large extent upon the physical properties of the polymer that is to be produced.

The organic vehicle or solvent employed can be an aliphatic alkane or cycloalkane such as pentane, hexane, heptane, or cyclohexane, or a hydrogenated aromatic compound, such as tetrahydronaphthalene or decahydronaphthalene, or a high molecular weight liquid paraffin or mixture of paraffins which are liquid at reaction temperature, or an aromatic hydrocarbon, such as benzene, toluene, xylene. An odorless naphtha or mineral spirits solvent can be used in our process. The nature of the vehicle is subject to considerable variation, although the vehicle employed should be a liquid under the conditions of reaction and completely inert. The hydrocarbon liquids are desirably employed. Other solvents which can be used include ethyl benzene, isopropyl benzene, ethyl toluene, normal propyl benzene, diethyl benzenes, mono- and dialkyl naphthalenes, normal octane, isooctane, methyl cyclohexane, and any of the other well-known inert liquid hydrocarbons.

The polymerization ordinarily is accomplished by merely admixing the components of the polymerization mixture and heating to the desired polymerization temperature. This temperature is maintained by heating and cooling as required. When highly uniform polymers are desired employing the continuous process wherein the relative proportion of the various components are maintained substantially constant, temperature is the controlling factor as regards molecular weight and is desirable controlled within a relatively narrow range. This is readily accomplished since the solvent vehicle forms a high percentage of the polymerization mixture and has to be heated or cooled to maintain the temperature as desired.

The only limitation on the temperature at which the process can be effected is the decomposition temperature of the catalyst. In addition, temperature alone is used to control the melt index or molecular weight of the polymer. The pressure employed need only be sufficient to maintain the reaction mixture in liquid form during the polymerization, although moderate pressures are desirable for optimum yield and reaction rates. Since the catalyst employed can be readily dispersed in the organic solvent for the reaction, the uniformity of reaction can be readily controlled.

Polymerization embodying the invention can be carried out batch-wise or in a continuous flowing stream process. Continuous processes are preferred for economic reasons, and particularly good results are obtained using a continuous process wherein a polymerization mixture of constant composition is continuously and progressively introduced in the polymerization zone, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared at low temperatures by batch processes. The ethylene or other alpha-monoolefin can be charged to the polymerization mixture either as a pure material or in admixture with other materials, such as hydrogen, and hydrocarbons, such as methane, ethane or propane. Ordinarily, relatively pure monomers are employed unless copolymers are desired. When the charged mixture consists of two or more olefins, the product consists of a true copolymer of the monomers rather than a mixture of homopolymers.

After the desired polymerization reaction has been carried out, the polymer that has been produced and the catalyst are separated from solvent in any suitable manner. In some instances, a filtration procedure can be employed for such separation. In other instances, it is desirable to use such procedures as centrifuging, decantation, and the like. It has been observed that solvent after separation from the polymer and catalyst contains substantial amounts of impurities and that upon repeated use in either a batch or a continuous process the solvent deteriorates. The extent of the deterioration is indicated by a lower yield of polymer upon re-use of the solvent in further polymerization reactions, and in order to maintain the rate of polymer production at a desirable level, it becomes necessary to increase the amount of catalyst and promoter charged to the polymerization reaction. It has also been observed that fractional distillation of the impure solvent does not provide sufficient purification to avoid the necessity for increased usage of catalyst charges to the polymerization reaction. It appears that solvent that has been employed in the polymerization reaction tends to accumulate impurities which are largely ketonic in nature. The oxygen for the formation of the carbonyl groups in the solvent impurities can come from the catalyst or the catalyst support. When using a 10% moylbdenum oxide catalyst on alumina support, it is possible to increase the carbonyl content of the polymerization reaction solvent by as much as 100 p.p.m. after usage in only one polymerization reaction. Solvent deterioration is greater when a highly branched aliphatic hydrocarbon solvent is employed because of the ease with which the tertiary carbon atoms of these solvents tend to oxidize. However, straight chain aliphatic hydrocarbon solvents, such as n-heptane and n-decane, also tend to undergo appreciable oxidation when used as solvent in an olefinic hydrocarbon polymerization reaction and particularly when the catalyst employed is a metal oxide.

The preferred solvent purification procedure of our invention is actually a multi-step process. In the first step of our purification procedure the carbonyl compounds which are the contaminants in the solvent are condensed by reaction at the boiling point of the solvent with a lower alkoxide or hydroxide of an alkali metal, such as sodium. The ratio of hydroxide or alkoxide to solvent in the first step of our process can be varied over a relatively wide range depending upon the amount of impurities that are present in the solvent. Any of the alkali metal hydroxides and alkali metal alkoxides can be employed in our process, and we prefer to use the sodium compounds in our first purification step. Among the compounds that can be used are sodium methoxide, sodium ethoxide, sodium propoxide, sodium isopropoxide, sodium butoxide and sodium isobutoxide. Similar compounds of potassium and lithium can also be used. We prefer to employ sodium methoxide because of its availability and low cost. In the first step of our process, we usually employ from 0.4 to 5 pounds of hydroxide or alkoxide per 1,000 gallons of impure solvent, and we treat the solvent with the hydroxide or alkoxide at a refluxing temperature for a period of time within the range of 0.5 to 15 hours. After the desired reaction has taken place, solvent is distilled from refluxing mixture, and it appears that as a result of this treatment, the solvent impurities are in a form for effective removal from the solvent. It is essential that during the first treatment step of our purification process spent metal oxide polymerization catalyst be absent from the solvent being treated. If spent catalyst is present during the first treatment step of our process, it tends to react with solvent to produce additional amounts of ketonic impurities which must be removed before the solvent is ready for use in a polymerization reaction.

In our purification process the distillate from which some impurities have already been removed in the first step of our process is passed into contact with a suitable adsorbent, such as silica gel, activated carbon, activated alumina and fuller's earth. We prefer to employ a silica gel in our percolation or adsorption step since much better results in the purification of our solvent are obtained with this type of adsorbent. The contact time that is required in the second step of our process depends upon a number of factors, such as the particle size of the adsorbent, the nature of the adsorbent, the purity of the initial solvent and the actual dimensions of the adsorbent bed. In many instances the desired purity of the solvent can be obtained using a space velocity of one volume of solvent per volume adsorbent per hour. It is important to analyze the effluent from the silica gel adsorption column periodically in order to determine the point at which the carbonyl compounds being adsorbed onto the silica gel bed begin to break through the bed. When the point at which break-through is reached, it is possible to concentrate the carbonyl impurities into a relatively small fraction of the solvent.

The ultra-violet absorption of polymerization solvent is an effective method for the study of solvent purity. Carbonyl compounds, and more particularly $\alpha,\beta$-unsaturated carbonyl compounds, have strong absorption in the ultra-violet regions. Deterioration of solvent and solvent purification can be followed by determining the increase in ultra-violet absorption at 240 millimicrons and 260–290 millimicrons. Accumulation of impurities during a single ethylene polymerization is shown in the following table. The data were observed by periodically withdrawing solvent (odorless naphtha) from an ethylene polymerization using a sodium promoted molybdenum oxide on alumina catalyst, filtering the solvent, diluting to 2 weight percent with pure isopropanol and observing the ultra-violet absorption.

| Wave Length, Millimicrons | Optical Density | | |
|---|---|---|---|
| | Start of Run | After 8 Hrs. | After 16 Hrs. |
| 220 | 0.300 | 0.580 | 0.950 |
| 230 | 0.048 | 0.360 | 0.720 |
| 240 | 0.025 | 0.280 | 0.500 |
| 250 | 0.012 | 0.150 | 0.260 |
| 260 | 0.002 | 0.070 | 0.120 |
| 270 | 0.000 | 0.037 | 0.082 |
| 280 | 0.000 | 0.023 | 0.066 |
| 290 | 0.000 | 0.017 | 0.058 |
| 300 | 0.000 | 0.012 | 0.052 |
| 310 | 0.000 | 0.010 | 0.048 |
| 320 | 0.000 | 0.008 | 0.044 |

The solvent that has thus been purified can be returned to the polymerization reactor for further polymerization reactions without any substantial increase in the amount of catalyst that is needed to maintain the initial rate of polymerization. At regular intervals, regeneration of the adsorption column becomes necessary, and the required regeneration can be accomplished by blowing a hot inert gas through the column. During the regeneration, the temperature of the column is maintained at or above the boiling point of the solvent that has been purified in the column. The time of regeneration can ordinarily be decreased by adding steam to the inert gas being blown through the column. The regeneration of the silica gel bed employed in our process can readily be accomplished by blowing methane or other inert gas containing from 10–25% steam through the bed of silica gel at a temperature within the range of 150–250° C. when an odorless mineral spirits solvent had been purified in the silica gel bed.

As a result of the use of our purification procedure in an olefin polymerization process, it is possible to maintain the initial high rate of polymerization without any substantial increase in the amount of catalyst that is employed. It is also possible to prepare a polymer whose color meets commercial specifications and in our invention we tend to decrease and, in fact, substantially eliminate color that ordinarily is imparted to the polymer as a result of impurities that accumulate in the solvent for the reaction. When an alkali metal-promoted metal oxide catalyst is employed in the polymerization reaction the carbonyl impurities in the solvent tend to react with the alkali metal promoter to form soluble compounds of the metal which tend to remain in the polymer. These compounds of the alkali metal tend to discolor the polymer, and when the polymer is heated by extrusion an objectionable yellow-to-brown color develops. By practicing our purification procedure this discoloration is substantially eliminated. It has also been noted that the same reaction of alkali metal promoter with the carbonyl impurities in the solvent is responsible for the high ash content of polymers prepared by procedures that do not employ our purification process. Our invention also substantially reduces the ash content that can be imparted to the polymer in this manner. The practice of our invention also makes it possible to use only a limited amount of catalyst promoter in the polymerization reaction. Catalyst promoters, such as sodium and the other alkali metals, when used in excess can actually be detrimental, and in our process we employ the catalyst promoters in an amount not in excess of the amount that can be adsorbed on the supported metal oxide catalyst.

The following examples are illustrative of our invention:

Example 1

A standard test for solvent quality was set up according to the following procedure:

Two grams of reduced 10% $MoO_3$—$Al_2O_3$ catalyst (average Mo valence 4.4–5.0) and 1.6 g. of sodium metal is added to 1000 ml. of the solvent to be tested. The mixture is transferred to a clean, dry 2-liter stirred autoclave and contacted with ethylene at 1000 p.s.i. and 240° C. for 14 hours. The quality of the solvent is determined by the yield of polyethylene obtained: good solvent makes at least 160 g. of polyethylene and poor solvent makes no polyethylene at all.

The effectiveness of various treatments for solvent purification is illustrated by the results given in the following table. In each case the starting solvent for the clean-up was an odorless naphtha of B.P. 180–200° C. which had been used repeatedly for ethylene polymerization with sodium-promoted molybdena-alumina catalyst and which had been distilled through a 10-plate column at high reflux ratio prior to use.

Solvent treatment:
Grams polyethylene Produced in standard test
1. Solvent without purification treatment _____ 5
2. Solvent refluxed 16 hours with sodium methoxide (1 part per 200 parts of solvent) and then distilled _____ 10
3. Solvent from 2 after percolation through silica gel _____ 162
4. Solvent refluxed 16 hours with 10% sodium hydroxide (1 part per 2 parts solvent), steam-distilled, and percolated through silica gel ___ 146
5. Solvent percolated through silica gel _____ 89

*Example 2*

Our invention has demonstrated that the preferred solvent purification includes a treatment with sodium methoxide at the reflux temperature followed by distillation and percolation through silica gel. This method of solvent purification was carried out by (1) refluxing 1000 gallons of recovered odorless naphtha with 5 lbs. of sodium methoxide (2) by distilling the treated solvent through a 10-plate column and (3) percolating the distillate at a rate of 30–40 gallons per hour through 100 pounds of 4–12 mesh silica gel contained in a 6″ x 20′ adsorber. Solvent thus treated was charged to an 82-gallon stirred autoclave and was used to prepare polyethylene with sodium-promoted catalyst containing 10 weight percent molybdenum oxide on alumina. Runs 3 and 4 described in the following table were made with treated solvent; Runs 1 and 2 were made with untreated solvent.

| Run | 1 | 2 | 3 | 4 |
|---|---|---|---|---|
| Solvent charged, lbs | 292 | 157 | 155 | 220 |
| Catalyst charged (10% MoO₃ on Al₂O₃, avg. Mo valence 4.6), g | 1,000 | 445 | 445 | 445 |
| Sodium charged, g | 800 | 190 | 190 | 190 |
| Time at reaction conditions, hrs | 28 | 20 | 18 | 22 |
| Time in autoclave (includes heat-up and discharge), hrs | 38 | 23 | 23 | 30 |
| Reaction temperature, °C | 252 | 252 | 252 | 252 |
| Ethylene pressure, p.s.i.g | 450 | 450 | 450 | 450 |
| Polyethylene content at end of run, percent | 9.0 | 10.1 | 24.3 | 20.3 |
| Ash content of product polyethylene, percent | 0.57 | 0.53 | 0.12 | 0.05 |
| Melt index of product polyethylene | 1.00 | 0.25 | 1.05 | 0.62 |
| Color of product polyethylene (T.E.C. Scale)[1] | 8B | 8B | 3B | 4B |
| Polyethylene recovered, lbs | 12.4 | 16 | 37 | 45 |

[1] The T.E.C. Color Scale is a series of standard color samples with 1 being the lightest and 8 the darkest. Color of 1 on T.E.C. Scale is equivalent to best natural color of commercial polyethylene.

It is important to note that ash content of the polyethylene is high and color is poor when untreated solvent is used. This is due to the reaction of carbonyl compounds in the recycle solvent with the sodium promoter to form soluble products which end up in the product polyethylene.

*Example 3*

A most important advantage of operating with solvent purified by our invention is that the catalyst and promoter charge to the reactor can be sharply reduced without detriment to the rate of polymerization or ultimate yield. The sodium charge can be reduced to the point where all of the sodium can be adsorbed on the surface of the catalyst support in the form of high surface sodium. When the sodium is in this form, it is readily removed from the polymer and the product polyethylene has much lower color and ash content. Runs 5, 6 and 7 were made in an 82-gallon reactor with odorless naphtha solvent (B.P.=180–200° C.) which had been used repeatedly in synthesis of polyethylene with a sodium-promoted molybdena-alumina catalyst. This solvent was purified by distillation from sodium methoxide (5 lbs. per 1000 gallons) through a 10-plate column and finally percolated through silica gel beds as described in Example 2.

| Run | 5 | 6 | 7 |
|---|---|---|---|
| Solvent charged, lbs | 220 | 225 | 225 |
| Catalyst charged (10% MoO₃ on Al₂O₃), g | 626 | 445 | 445 |
| Sodium charged, g | 135 | 96 | 60 |
| Time at reaction conditions, hrs | 18 | 17 | 17 |
| Total time in autoclave, hrs | 23 | 20 | 20 |
| Reaction temperature, °C | 255 | 255 | 255 |
| Ethylene pressure, p.s.i.g | 450 | 450 | 450 |
| Polyethylene content at end of run, wt. percent | 14.7 | 16.6 | 20.2 |
| Ash content of product polyethylene, percent | 0.010 | 0.003 | 0.010 |
| Melt index of product polyethylene | 1.16 | 1.32 | 0.62 |
| Color of product polyethylene (T.E.C. Scale) | 1 | 1 | 1 |
| Polyethylene recovered, lbs | 40 | 42 | 48 |

Polyethylenes of this invention are highly crystalline and usually exhibit crystallinity above 80 percent as shown by X-ray diagrams. Ordinarily, the crystallinity for the polyethylenes obtained by this process average above 90 percent. In contrast to the high pressure polyethylene known heretofore, the number of methyl groups per 100 carbon atoms in the polyethylenes of this invention are of the order of 0.5 or lower. The densities are of the order of 0.945 or higher, with densities of the order of 0.96 or higher being obtained in many cases. The inherent viscosities measured in tetralin at 145° C. may be varied from about 0.5 or lower to 5.0 or higher. Melt indices as measured by the standard ASTM method may be varied from about 0.001 to 100 or even higher.

Thus, polyethylene prepared by means of this invention and having a molecular weight in the range of 50,000 exhibits density above 0.95, a softening temperature of at least 130° C., a tensile strength of 3000–5500 p.s.i. and a stiffness in flexure at 5 percent deflection (ASTM Test D74-7-50) of at least 50,000 p.s.i.

The polyolefins prepared according to the invention can be molded or extruded into flexible plates or films. The products can be extruded in the form of pipe or tubing of greater rigidity than usual high pressure polyethylene or it can be injection molded into a great variety of articles. The polymers can also be cold drawn into ribbons, bands, fibers, or filaments of high elasticity and rigidity. Fibers of high strength can be spun from molten polyethylene or from molten polypropylene obtained according to this process. Polypropylene prepared in the same way also has a very high degree of crystallinity and a very high density, and the polymers of other alpha-olefins have similarly improved properties. The process of the invention can also be employed to effect the copolymerization of ethylene with other polymerizable α-monoolefins and particularly with propylene, 1-butene and 1-hexene. Other monoolefins which are suitably employed either alone or in admixture include such materials as butene-1, isobutylene, 1-pentene, 1-hexene, 1-decene, styrene and similar α-monoolefins. In some cases, it is desirable to prepare copolymers of the α-monoolefins in order to modify the properties for particular uses such as in molding or extrusion applications. Thus, copolymers of 5–95 percent ethylene with 95–5 percent propylene are desirably prepared in many cases. A copolymer of ethylene with from 2–10 percent 1-hexene also has desirable properties.

Although the invention has been described in considerable detail with reference to certain preferred embodiments thereof, variations and modifications can be effected within the spirit and scope of this invention as described hereinabove and as defined in the appended claims.

We claim:

1. The process for polymerizing an α-olefinic hydrocarbon selected from the group consisting of ethylene and propylene to solid polymer which comprises polymerizing with α-olefinic hydrocarbon in a normally liquid aliphatic hydrocarbon solvent using a molybdenum oxide catalyst that produces carbonyl-containing impurities substantially soluble in said solvent, separating solvent containing carbonyl-containing impurities from polymer and catalyst, refluxing said solvent, substantially free of solid polymer and insoluble polymerization catalyst, with a lower alkoxide of an alkali metal, distilling solvent from refluxing mixture, passing resulting distillate into contact with a bed of silica gel particles and recycling thus-purified hydrocarbon solvent to said α-olefinic hydrocarbon polymerization step.

2. The process for polymerizing ethylene to solid polymer which comprises polymerizing ethylene in a normally liquid aliphatic hydrocarbon solvent using a sodium-promoted molybdenum oxide catalyst dispersed on alumina, said catalyst producing carbonyl-containing impurities substantially soluble in said solvent during said polymerization step, separating solvent containing carbonyl-containing impurities from polyethylene and catalyst, refluxing said solvent, substantially free of solid polyethylene and insoluble polymerization catalyst, with sodium methoxide, distilling solvent from refluxing mixture, passing resulting distillate into contact with a bed of silica gel particles and recycling thus-purified hydrocarbon solvent to said ethylene polymerization step.

3. The process for polymerizing ethylene to solid polymer which comprises polymerizing ethylene in a normally liquid saturated aliphatic hydrocarbon solvent using a sodium-promoted molybdenum oxide catalyst dispersed on alumina, said catalyst containing an amount of sodium not in excess of the maximum amount of sodium that can be adsorbed on said catalyst and said catalyst producing carbonyl-containing impurities substantially soluble in said solvent during said polymerization reaction, separating solvent containing carbonyl-containing impurities from polyethylene and catalyst, refluxing said solvent, substantially free of solid polyethylene and insoluble polymerization catalyst with sodium methoxide for a period of 0.5 to 15 hours, distilling solvent from refluxing mixture, passing resulting distillate into contact with a bed of silica gel particles and recycling thus-purified hydrocarbon solvent to said ethylene polymerization step.

4. The process for polymerizing ethylene to solid polymer which comprises polymerizing ethylene in a normally liquid saturated aliphatic hydrocarbon solvent using a sodium-promoted molybdenum oxide catalyst dispersed on alumina, said catalyst containing 5 to 25 weight percent sodium and said catalyst producing carbonyl-containing impurities substantially soluble in said solvent, separating solvent containing carbonyl-containing impurities from polyethylene and catalyst, refluxing said solvent substantially free of solid polyethylene and insoluble polymerization catalyst, with from 0.5 to 5 pounds of sodium methoxide per 1000 gallons of solvent for a period of 0.5 to 15 hours, distilling solvent from refluxing mixture, passing resulting distillate into contact with a bed of silica gel particles, and recycling thus-purified hydrocarbon solvent to said ethylene polymerization step.

5. The process for polymerizing α-olefinic hydrocarbon to solid polymer which comprises polymerizing said α-olefinic hydrocarbon in a normally liquid hydrocarbon solvent using a metal oxide catalyst that produces carbonyl-containing impurities substantially soluble in said solvent, separating solvent containing carbonyl-containing impurities from polymer and catalyst, distilling said solvent substantially free of solid polymer and insoluble polymerization catalyst, with a basic compound selected from the group consisting of hydroxides and lower alkoxides of alkali metals, passing resulting distillate into contact with a bed of silica gel particles, and recycling thus-purified hydrocarbon solvent to said α-olefinic hydrocarbon polymerization step.

6. In the polymerization of α-olefinic hydrocarbon to solid polymer in a normally liquid hydrocarbon solvent using a metal oxide catalyst that produces carbonyl-containing impurities substantially soluble in said solvent, the improvement which comprises removing carbonyl-containing impurities from said solvent, substantially free of solid polymer and insoluble polymerization catalyst, by distilling said solvent with a basic compound selected from the group consisting of hydroxides and lower alkoxides of alkali metals and passing resulting distillate into contact with a bed of silica gel particles.

7. The process for removing substantially soluble carbonyl-containing impurities from a normally liquid hydrocarbon solvent, said impurities resulting from the polymerization of an α-olefinic hydrocarbon in said hydrocarbon solvent using a metal oxide catalyst, which comprises distilling said hydrocarbon solvent, substantially free of solid polymer and insoluble polymerization catalyst, with a lower alkoxide of an alkali metal, and passing resulting distillate through a bed of silica gel particles.

References Cited in the file of this patent

UNITED STATES PATENTS

| 2,725,374 | Mosher | Nov. 29, 1955 |
| 2,890,214 | Brightbill et al. | June 9, 1959 |
| 2,900,373 | Martin | Aug. 18, 1959 |
| 2,963,520 | Neal | Dec. 6, 1960 |

FOREIGN PATENTS

| 815,310 | Great Britain | June 24, 1959 |